United States Patent [19]

Bares

[11] Patent Number: 5,250,107
[45] Date of Patent: Oct. 5, 1993

[54] WATER-FAST INK COMPOSITION AND METHOD FOR MAKING THE SAME

[75] Inventor: Steven J. Bares, Corvallis, Oreg.

[73] Assignee: Hewlett-Packard Company, Palo Alto, Calif.

[21] Appl. No.: 738,708

[22] Filed: Jul. 31, 1991

[51] Int. Cl.$^5$ .............. C09D 11/02; C09B 45/38; C09B 31/02; C07C 245/00
[52] U.S. Cl. .................. 106/20 R; 106/20 D; 106/21 D; 106/22 R; 8/673; 534/661; 534/836
[58] Field of Search .............. 106/20, 22, 20 R, 20 D, 106/21 D, 22 R; 8/673; 534/661, 683, 806, 836

[56] References Cited

U.S. PATENT DOCUMENTS

| | | | |
|---|---|---|---|
| 4,500,895 | 2/1985 | Buck et al. | 346/140 |
| 4,513,298 | 4/1985 | Scheu | 346/140 |
| 4,732,786 | 3/1988 | Patterson et al. | 428/341 |
| 4,794,409 | 12/1988 | Cowger et al. | 346/140 |
| 4,841,037 | 6/1989 | Ohta et al. | 534/806 |
| 4,963,189 | 10/1990 | Hindagolla | 106/22 |
| 5,053,495 | 10/1991 | Greenwood et al. | 534/836 |
| 5,156,674 | 10/1992 | Cells | 106/20 R |

OTHER PUBLICATIONS

Information Sheet from Hopton Technologies, Inc.
Hewlett-Packard Journal, vol. 36, No. 5 (May 1985).
Hewlett-Packard Journal, vol. 39, No. 4 (Aug. 1988).
The Color Index, vol. 4, 3rd ed., published by The Society of Dyers and Colourists, Yorkshire, England, pp. 4336, 4340, 4341 (1971).

Primary Examiner—Paul R. Michl
Assistant Examiner—Tae H. Yoon

[57] ABSTRACT

A water-fast ink composition and method for making the same. A selected chemical dye having at least one functional group with an extractable hydrogen atom thereon (e.g. —COOH, —NH$_2$, or —OH) is combined with an ammonium zirconium polymer salt (e.g. ammonium zirconium carbonate, ammonium zirconium acetate, ammonium zirconium sulfate, ammonium zirconium phosphate, and ammonium zirconium oxalate). The resulting mixture preferably contains about 0.01-5.0% by weight ammonium zirconium polymer salt and about 0.5-5.0% by weight chemical dye. Upon dehydration of the mixture, the ammonium zirconium polymer salt and chemical dye form a cross-linked dye complex which is stable and water-fast. The mixture may be dispensed onto a variety of substrates (e.g. paper) using thermal inkjet or other printing systems.

20 Claims, No Drawings

WATER-FAST INK COMPOSITION AND METHOD FOR MAKING THE SAME

BACKGROUND OF THE INVENTION

The present invention generally relates to printing technology, and more specifically to the production and use of water-fast ink compositions.

Substantial developments have been made in the field of electronic printing technology. Specifically, a wide variety of highly efficient printing systems currently exist which are capable of dispensing ink in a rapid and accurate manner. Thermal inkjet systems are especially popular in this regard. Thermal inkjet systems basically include an ink reservoir in fluid communication with a substrate having a plurality of resistors thereon. Selective activation of the resistors causes thermal excitation of the ink and expulsion thereof from the ink cartridge. Representative thermal inkjet systems are discussed in U.S. Pat. Nos. 4,500,895 to Buck et al.; 4,513,298 to Scheu; 4,794,409 to Cowger, et al.; the Hewlett-Packard Journal, Vol. 36, No. 5 (May 1985); and the Hewlett-Packard Journal, Vol. 39, No. 4 (August 1988), all of which are incorporated herein by reference.

Notwithstanding the existence of advanced printing systems, additional research has also been conducted in order to produce new and effective ink products to be used in these systems. For example, it is important for ink products to be "water-fast". The term "water-fast" as used herein shall signify an ink product which does not smear, bleed, run, or the like when exposed to moisture after printing is completed. Inks which are not substantially water-fast produce documents that are not entirely permanent and subject to print quality degradation.

Accordingly, a need remains for an ink composition which is both water-fast and suitable for use in a wide variety of printing systems, including but not limited to thermal inkjet units. The present invention satisfies this need in a unique manner as described herein below.

SUMMARY OF THE INVENTION

It is an object of the present invention to provide an improved ink composition and method for making the same.

It is another object of the invention to provide an improved ink composition which is water-fast upon exposure to moisture after printing.

It is further object of the invention to provide an improved water-fast ink composition which uses a minimal number of chemical components.

It is a further object of the invention to provide an improved water-fast ink composition having a water-fast control agent which is usable in connection with a wide variety of dye systems.

It is a still further object of the invention to provide an improved water-fast ink composition which is non-toxic.

It is a still further object of the invention to provide an improved water-fast ink composition which is easily formulated using readily available chemical components.

It is an even further object of the invention to provide an improved water-fast ink composition which is readily dispensed using a wide variety of printing systems.

It is an even further object of the invention to provide an efficient method for printing using the water-fast ink composition described herein.

In accordance with the foregoing objects, the present invention involves an improved water-fast ink composition and methods for making/using the same. The ink composition and methods described herein are highly effective in producing clear and stable printed images. The composition basically consists of a selected dye known in the art having a structure which includes at least one and preferably a plurality of functional groups each having at least one extractable hydrogen atom thereon which is capable of being "donated" under the proper chemical conditions. Representative functional groups in this regard include but are not limited to —COOH, —NH$_2$, and —OH. A wide variety of dyes having these functional groups are readily available. The selected dye is then combined with an ammonium zirconium polymer salt. Representative ammonium zirconium polymer salts include but are not limited to ammonium zirconium carbonate, ammonium zirconium acetate, ammonium zirconium sulfate, ammonium zirconium phosphate, and ammonium zirconium oxalate. In a preferred embodiment, the mixture will be formulated to include about 0.01–5.0% by weight ammonium zirconium polymer salt. Combination of the dye with the ammonium zirconium polymer salt results in a mixture which can then be dispensed by various printing systems (e.g. thermal inkjet units). After delivery by the selected printing system, the ink composition immediately and spontaneously begins to dehydrate (e.g. dry). During this process, the dye and ammonium zirconium polymer salt cross-link to each other, resulting in an insoluble complex which is substantially water-fast. Complexation occurs when each functional group in the dye having an extractable hydrogen atom donates the hydrogen atom, producing an anionic group on the dye molecule. The anionic group spontaneously binds to one of the zirconium atoms in the ammonium zirconium polymer salt. As a result, an insoluble cross-linked dye complex is created which produces a water-fast printed image. The composition described herein represents an important advance in the art of printing technology, and satisfies a long-felt need for highly efficient and stable ink materials.

These and other objects, features, and advantages of the invention will be described below in the following Detailed Description of Preferred Embodiments.

DETAILED DESCRIPTION OF PREFERRED EMBODIMENTS

The present invention involves an improved ink composition which is capable of producing water-fast images, and is readily dispensed using a wide variety of printing systems (including thermal inkjet units). In order to produce the ink compositions of the present invention, a dye is first selected For the purposes of this invention as described in greater detail below, each dye should have one or more functional groups thereon, each group including at least one extractable hydrogen atom. The term "extractable hydrogen atom" as used herein shall signify a hydrogen atom which is capable of being released or donated when coupled with a strong electron acceptor. Representative functional groups having one or more extractable hydrogen atoms as defined herein include but are not limited to —COOH, —NH$_2$, and —OH. Compositions having functional groups with extractable hydrogen atoms are commonly known as "lewis acids". As stated in Morrison, R. T., et al., *Organic Chemistry*, Allyn and Bacon, Inc., Boston, Mass. (1973), a "lewis acid" is defined as a substance that can take up an electron pair to form a covalent bond. Exemplary dye materials having extractable hydrogen atoms which are suitable for use in the present invention are commercially available from a variety of sources including but not limited to the Hewlett-Packard Company of Palo Alto, Calif. These dye materials are listed in U.S. Pat. No. 4,963,189 to Hindagolla which is incorporated herein by reference. Such materials involve the following basic structure:

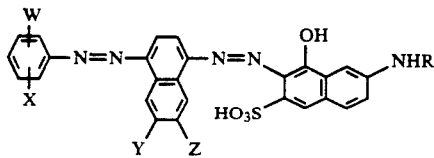

In this structure, it is preferred that there be at least two COOH groups, and that the number of COOH groups be equal to or greater than the number of SO$_3$H groups. Specific and exemplary dye structure are provided in Table I below:

TABLE I

| Dye # | X      | W      | Y      | Z      | R          |
|-------|--------|--------|--------|--------|------------|
| 1     | 3-COOH | 5-COOH | H      | H      | H          |
| 2     | 3-COOH | 5-COOH | COOH   | H      | H          |
| 3     | 3-COOH | 5-COOH | H      | COOH   | H          |
| 4     | 3-COOH | 5-COOH | H      | SO$_3$H | H         |
| 5     | 3-COOH | 5-COOH | SO$_3$H | H     | H          |
| 6     | H      | 4-COOH | H      | COOH   | H          |
| 7     | 3-COOH | 4-COOH | H      | H      | CH$_2$COOH |
| 8     | 2-COOH | 5-COOH | H      | SO$_3$H | CH$_2$COOH |
| 9     | 3-COOH | 5-COOH | SO$_3$H | H     | CH$_2$COOH |
| 10    | 3-COOH | 5-COOH | H      | H      | CH$_2$CH$_2$COOH |
| 11    | 3-COOH | 5-COOH | H      | COOH   | CH$_2$COOH |

Additional dye materials suitable for use in the present invention are described in the *Color Index*, Vol. 4, 3rd ed., published by The Society of Dyers and Colourists, Yorkshire, England (1971), which is incorporated herein by reference Exemplary dye materials listed in the *Color Index* which are suitable for use herein include the acid forms of the following dyes listed on pages 4336 and 4341: C. I. Direct Brown 13, C. I. Direct Brown 14, C. I. Dull Brown 215, C. I. Mordant Brown 36, C. I. Direct Black 122, and C. I. Direct Brown 74.

It should again be noted that production of the ink composition in accordance with the present invention shall not be limited to the above dye materials. Other materials known in the art having the characteristics set forth herein may also be used with equal effectiveness. In a preferred embodiment, the completed ink composition shall include about 0.5-5.0% by weight dye (about 2.0%=optimum).

Next, the selected dye is combined with one or more solvent materials. A wide variety of different solvents may be used as described in U.S. Pat. No. 4,936,189, although it is preferred that a dual solvent system be employed. For example, a first solvent preferably consisting of water is combined with a second solvent which is organic in character. Representative organic solvents suitable for this purpose include but are not limited to 2-pyrillidone, ethylene glycol, diethylene glycol, triethylene glycol, tetraethylene glycol, and the like. In a preferred embodiment, the completed ink composition will include about 60-90% by weight first solvent (about 90%=optimum), and about 0.0-10.0% by weight second solvent (about 8%=optimum). A dual solvent system as described above is preferably used because the selected dye must remain soluble in the second solvent after all of the first solvent has evaporated. This prevents dye crusts (e.g. dried dye materials) from forming and blocking the operation of the printhead when it is in a "stand-by" or non-operational mode. Thus, the dual solvent system facilitates printer operation and prevents system malfunctions due to the formation of dye crusts. While a dual solvent system is useful and preferred, it is not required. In an alternative embodiment, only a single solvent (e.g. water) may be used. This type of solvent system is useful in connection with printing units which operate in a substantially continuous manner with a minimal (or non-existent) amount of "stand-by" time. In this environment, dye crust formation is not a significant problem in view of the minimal amount of time in which the printing system is non-operational In any event, the combined total amount of solvent to be used in the ink composition of the invention (including both solvents if a dual solvent system is used) should be about 60-99% by weight of the ink composition (about 97%=optimum).

An optional biocide known in the art may also be added to the dye and solvent in order to prevent any microbial growth in the final ink composition. An exemplary biocide for this purpose would include a proprietary product sold under name PROXEL TM by Imperial Chemical Industries of Manchester, England. In a preferred embodiment, if a biocide is used, the final ink composition will include about 0.0001-0.10% by weight biocide (about 0.01% by weight=optimum).

Next, the components listed above are combined with a cross-linking agent. This agent consists of a selected ammonium zirconium polymer salt. For the purposes of this invention, the term "ammonium zirconium polymer salt" shall involve a composition having the following polymer structure:

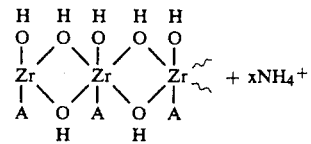

A=CO$_3$$^-$, CH$_2$COO$^-$, PO$_4$$^{-2}$, SO$_4$$^-$, or C$_2$, O$_4$ $^-$x corresponds to the charge characteristics of A and size of the molecule It is commercially available from Hopton Technologies, Inc. of Albany, Oreg. The polymer shown above (which terminates for illustration purposes at the left side thereof) includes three zirconium atoms. However, in a preferred embodiment of the invention, the ammonium zirconium polymer salt will include between about two and five zirconium atoms. Thus, the structure shown above may continue from the right side onward to form a longer polymer chain. Also, as noted above, preferred ammonium zirconium polymer salts will include but not be limited to ammonium zirconium carbonate, ammonium zirconium acetate, ammonium zirconium phosphate, ammonium zirconium sulfate, and ammonium zirconium oxalate. In addition, it is preferred that the final ink composition include about 0.01-5.0% by weight ammonium zirconium polymer salt (about 0.5%=optimum). In summary, an exemplary ink composition produced in accordance with the invention is described below in Table II:

TABLE II

| Component | Wt. % |
| --- | --- |
| Dye (selected from Table I above) | 2.0 |
| First solvent (H₂O) | 93.0 |
| Second solvent (2-pyrillidone) | 4.49 |
| Ammonium zirconium carbonate | 0.50 |
| Biocide | 0.01 |
| | 100.0% |

Again, the present invention shall not be limited to the composition listed above in Table I. Other formulations within the parameters expressed herein will also function efficiently.

The resulting ink composition is non-toxic, and will preferably have a viscosity of about 1.06 cps and a surface tension of about 45-72 dynes/cm. Special reaction conditions are not required during the ink formulation process which may take place at room temperature (e.g. about 70 degrees F). It should be noted that formulations of the above ink composition as described herein should preferably avoid the use of additional additives (e.g. preservatives, antidecomposition agents, cleaning agents, and the like) which include and/or release anions that are known by individuals skilled in chemical technology to react with zirconium. For example, such anions may include phosphate, sulfate, and oxalate. When any additional materials are added to the composition which include potentially reactive anions, tests should first be conducted in order to determine whether a side reaction with zirconium will occur. Such tests would involve combining the proposed additive with the ammonium zirconium polymer salt and observing whether a solid precipitate forms. Formation of the precipitate indicates that a side reaction is taking place and that the proposed additive should be avoided.

The completed ink composition is non-toxic, stable, and is not cross-linked prior to use. Instead, dehydration of the ink composition results in cross-linking of the dye and ammonium zirconium polymer salt which creates a cross-linked dye complex that is stable and water-fast. Prior to dehydration, water molecules in the ink composition are electrically attracted to the ammonium zirconium polymer salt forming a micelle-like structure in which access to the zirconium atoms is blocked. When dehydration occurs, the water molecules are removed, thereby allowing a cross-linking reaction to spontaneously occur between the ammonium zirconium polymer salt and reactive functional groups in the dye. This occurs because the ammonium zirconium polymer salt is a strong electron acceptor which is capable of removing extractable hydrogen ions from the dye molecules as described above, thereby causing a cross-linking reaction to occur. An exemplary cross-linking reaction sequence involving ammonium zirconium carbonate is schematically illustrated as follows:

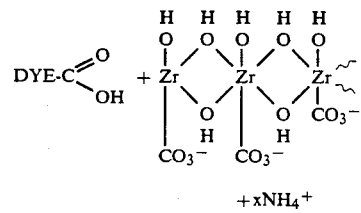

(1)

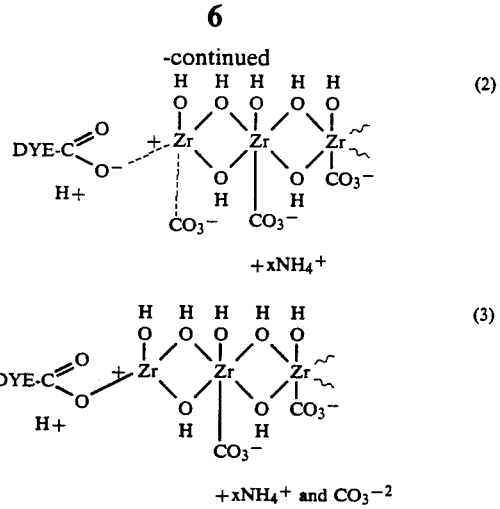

As indicated above, the dye molecules each include a functional group having an extractable hydrogen atom thereon (e.g. —COOH) as shown in reaction (1). With reference to reaction (2), hydrogen ions are released, followed by the binding of negatively charged oxygen ($O^-$) groups to zirconium in the ammonium zirconium polymer salt. The attractive forces between the negatively charged oxygen ($O^-$) groups of the dye molecules are greater than the bond energies between the zirconium and its associated anionic carbonate groups. This results in cross-linkage between the dye molecules and zirconium atoms as shown in reaction (3) and expulsion of carbonate groups therefrom. Accordingly, a cross-linked dye complex is formed upon dehydration, thereby producing a stable, water-fast image. The image is water-fast because the ammonium zirconium polymer salt reacts to covalently bond with multiple dye molecules as illustrated above, thereby reducing the mobility and solubility of the dye.

The ink composition as described herein is readily dispensed using a wide variety of conventional printing systems. For example, the ink composition is especially suitable for use in thermal inkjet systems. Representative thermal inkjet printing systems are described in U.S. Pat. Nos. 4,500,895 to Buck et al.; 4,513,298 to Scheu; and 4,794,409 to Cowger, et al. However, the present invention shall not be limited to only the systems described in these patents. To use the ink compositions in a thermal inkjet system, they are loaded into cartridges or the like which are inserted into conventional printing hardware, followed by activation of the printing system. The ink is then expelled and delivered (applied) onto a substrate (e.g. manufactured out of paper, plastic, or the like). The ink composition dries in a spontaneous manner, producing a clear, crisp, and water-fast image.

Having described herein preferred embodiments of the present invention it is anticipated that suitable modifications may be made thereto by individuals skilled in the art within the scope of the invention. For example, various other dyes, solvents, and the like may be used in addition to those specifically mentioned herein. Thus, the scope of the invention shall only be construed in accordance with the following claims:

The invention that is claimed is:

1. A method for manufacturing a water-fast ink composition comprising the steps of:

obtaining supply of a chemical dye comprising at least one functional group having at least one extractable hydrogen atom thereon; and combining said chemical dye with an ammonium zirconium polymer salt in order to form a mixture, said chemical dye and said ammonium zirconium polymer salt in said mixture binding together to produce a cross-linked dye complex upon dehydration thereof.

2. The method of claim 1 wherein said functional group is selected from the group consisting of —COOH, —NH$_2$, and —OH.

3. The method of claim 1 wherein said mixture comprises about 0.01–5.0% by weight said ammonium zirconium polymer salt.

4. The method of claim 1 wherein said mixture comprises about 0.5–5.0% by weight said chemical dye.

5. The method of claim 1 wherein said ammonium zirconium polymer salt is selected from the group consisting of ammonium zirconium carbonate, ammonium zirconium phosphate, ammonium zirconium sulfate, ammonium zirconium acetate, and ammonium zirconium oxalate.

6. A method for manufacturing a water-fast ink composition comprising the steps of:
obtaining a supply of a chemical dye comprising at least one functional group having at least one extractable hydrogen atom thereon, said functional group being selected from the group consisting of —COOH, —NH$_2$, and —OH; and combining said chemical dye with an ammonium zirconium polymer salt selected from the group consisting of ammonium zirconium carbonate, ammonium zirconium phosphate, ammonium zirconium sulfate, ammonium zirconium acetate, and ammonium zirconium oxalate in order to form a mixture, said mixture comprising about 0.01–5.0% by weight said ammonium zirconium polymer salt and about 0.5–5.0% by weight said chemical dye, said chemical dye and said ammonium zirconium polymer salt in said mixture binding together to produce a cross-linked dye complex upon dehydration thereof.

7. A water-fast ink composition comprising:
a chemical dye, said dye comprising at least one functional group having at least one extractable hydrogen atom thereon; and
an ammonium zirconium polymer salt combined with said chemical dye.

8. The composition of claim 7 wherein said functional group is selected from the group consisting of —COOH, —NH$_2$, and —OH.

9. The composition of claim 7 wherein said composition comprises about 0.01–5.0% by weight said ammonium zirconium polymer salt.

10. The composition of claim 7 wherein said composition comprises about 0.5–5.0% by weight said chemical dye.

11. The composition of claim 7 wherein said ammonium zirconium polymer salt is selected from the group consisting of ammonium zirconium carbonate, ammonium zirconium phosphate, ammonium zirconium sulfate, ammonium zirconium acetate, and ammonium zirconium oxalate.

12. A water-fast ink composition comprising:
a chemical dye, said dye comprising at least one functional group having at least one extractable hydrogen atom thereon, said functional group being selected from the group consisting of —COOH, —NH$_2$, and —OH; and an ammonium zirconium polymer salt selected from the group consisting of ammonium zirconium carbonate, ammonium zirconium phosphate, ammonium zirconium sulfate, ammonium zirconium acetate, and ammonium zirconium oxalate combined with said chemical dye in order to form said composition, said composition comprising about 0.01–5.0% by weight said ammonium zirconium polymer salt and about 0.5–5.0% by weight said chemical dye.

13. A method for printing a water-fast image onto a substrate comprising the steps of:
providing a water-fast ink composition, said ink composition comprising a chemical dye comprising at least one functional group having at least one extractable hydrogen atom thereon, and an ammonium zirconium polymer salt combined with said chemical dye;

supplying a printing apparatus with said ink composition;

activating said printing apparatus in order to cause said apparatus to apply said ink composition onto said substrate; and allowing said ink composition on said substrate to dry in order to produce said water-fast image thereon.

14. The method of claim 13 wherein said printing apparatus comprises a thermal inkjet printing system.

15. The method of claim 13 wherein said functional group is selected from the group consisting of —COOH, —NH$_2$, and —OH.

16. The method of claim 13 wherein said ink composition comprises about 0.01–5.0% by weight said ammonium zirconium polymer salt.

17. The method of claim 13 wherein said ink composition comprises about 0.5–5.0% by weight said chemical dye.

18. The method of claim 13 wherein said ammonium zirconium polymer salt is selected from the group consisting of ammonium zirconium carbonate, ammonium zirconium phosphate, ammonium zirconium sulfate, ammonium zirconium acetate, and ammonium zirconium oxalate.

19. A method for printing a water-fast image onto a substrate comprising the steps of:
providing a water-fast ink composition, said ink composition comprising a chemical dye comprising at least one functional group having at least one extractable hydrogen atom thereon, said functional group being selected from the group consisting of —COOH, —NH$_2$, and —OH, said ink composition further comprising an ammonium zirconium polymer salt combined with said chemical dye, said ammonium zirconium polymer salt being selected from the group consisting of ammonium zirconium carbonate, ammonium zirconium phosphate, ammonium zirconium sulfate, ammonium zirconium acetate, and ammonium zirconium oxalate, said ink composition comprising about 0.01–5.0% by weight said ammonium zirconium polymer salt and about 0.5–5.0% by weight said chemical dye;

supplying a printing apparatus with said ink composition;

activating said printing apparatus in order to cause said apparatus to apply said ink composition onto said substrate; and allowing said ink composition on said substrate to dry in order to produce said water-fast image thereon.

20. The method of claim 19 wherein said printing apparatus comprises a thermal inkjet printing system.

* * * * *